US011005634B2

(12) United States Patent
Mahajan et al.

(10) Patent No.: US 11,005,634 B2
(45) Date of Patent: May 11, 2021

(54) DYNAMIC FLOW CONTROL IN AMPDU AGGREGATION IN WIRELESS COMMUNICATIONS

(71) Applicant: MediaTek Singapore Pte. Ltd., Singapore (SG)

(72) Inventors: Rahul Mahajan, Noida (IN); Abhijeet Singh Katiyar, Noida (IN); Tarun Kumar Datta, Noida (IN); Vishal Bhargava, Noida (IN); Abhijit Uplenchwar, Noida (IN)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/518,988

(22) Filed: Jul. 23, 2019

(65) Prior Publication Data

US 2020/0322111 A1    Oct. 8, 2020

(30) Foreign Application Priority Data

Apr. 2, 2019    (IN) .............................. 201921013309

(51) Int. Cl.
*H04L 5/00*    (2006.01)
*H04L 29/08*    (2006.01)
*H04W 84/12*    (2009.01)

(52) U.S. Cl.
CPC .......... *H04L 5/0055* (2013.01); *H04L 69/324* (2013.01); *H04W 84/12* (2013.01)

(58) Field of Classification Search
CPC ... H04L 1/1607; H04L 1/1671; H04L 5/0055; H04L 69/324; H04W 84/12
See application file for complete search history.

(56) References Cited

U.S. PATENT DOCUMENTS

2010/0202347 A1*    8/2010    Sridhara ............... H04L 1/1607
                                                              370/328
2018/0109463 A1    4/2018    Chiu et al.

FOREIGN PATENT DOCUMENTS

WO    WO 2016144887 A1    9/2016
WO    WO-2019143332 A1 *  7/2019 ........... H04L 1/1671

* cited by examiner

*Primary Examiner* — Khoa Huynh
(74) *Attorney, Agent, or Firm* — Han IP PLLC; Andy M. Han

(57) ABSTRACT

A first communication apparatus dynamically controls data flow in aggregated medium access control (MAC) protocol data unit (AMPDU) aggregation by negotiating an initial block acknowledgement (Block-ACK) window size for the AMPDU aggregation with the second communication apparatus. The first communication apparatus adjusts the AMPDU aggregation during subsequent communication with the second communication apparatus by creating a Block-ACK frame with a reserved field, which has a value indicating a change to the AMPDU aggregation, and then transmitting the Block-ACK frame to the second communication apparatus.

13 Claims, 5 Drawing Sheets

DYNAMIC FLOW CONTROL IN AMPDU AGGREGATION IN WIRELESS COMMUNICATIONS

CROSS REFERENCE TO RELATED PATENT APPLICATION(S)

The present disclosure is part of a non-provisional patent application claiming the priority benefit of India Patent Application No. 201921013309, filed 2 Apr. 2019, the content of which being incorporated herein by reference in its entirety.

TECHNICAL FIELD

The present disclosure is generally related to wireless communications and, more particularly, to dynamic flow control in aggregated medium access control (MAC) protocol data unit (AMPDU) aggregation in wireless communications.

BACKGROUND

Unless otherwise indicated herein, approaches described in this section are not prior art to the claims listed below and are not admitted as prior art by inclusion in this section.

According to the Institute of Electrical and Electronics Engineers (IEEE) 802.11 specifications, the AMPDU mechanism improves throughput efficiency by aggregating several MAC protocol data units (MPDUs) into a single AMPDU and limiting single block acknowledgement (Block-ACK) for multiple MPDUs. Under the existing specification, however, there is currently no mechanism (particularly by a receiving entity) to dynamically change a count of MPDUs for the AMPDU aggregation, herein interchangeably referred to as the AMPDU aggregation count, which is negotiated during initial add block acknowledgement (ADDBA) setup. As a result, the receiving entity would have no mechanism to control the flow of packets from a transmitting entity. Moreover, the receiving entity would tear down and set up again the Block-ACK agreement in order to control the AMPDU aggregation count for a particular traffic identifier (TID).

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose novel schemes, solutions, mechanisms, methods and systems for dynamic flow control for AMPDU aggregation in wireless communications.

In one aspect, a method may involve a processor of a communication apparatus negotiating with a second communication apparatus an initial Block-ACK window size for AMPDU aggregation received. The method may also involve the processor adjusting the AMPDU aggregation during subsequent communication with the second communication apparatus by: (1) creating a Block-ACK frame with a reserved field having a value indicating a change to an AMPDU aggregation window size and (2) transmitting the Block-ACK frame to the second communication apparatus.

In one aspect, a method may involve a processor of a communication apparatus receiving AMPDUs from a second communication apparatus. The method may also involve the processor transmitting a Block-ACK frame to the second communication apparatus, with the Block-ACK frame simultaneously acknowledging receipt of the AMPDU and adjusting an AMPDU aggregation window size for subsequent communication with the second communication apparatus.

In one aspect, an apparatus may include a communication device and a processor coupled to the communication device. The communication device may be capable of wirelessly communicating with a second communication apparatus. The processor may be capable dynamically adjusting AMPDU aggregation received from the second communication apparatus by transmitting, via the communication device, one or more Block-ACK frames to the second communication apparatus.

It is noteworthy that, although description provided herein may be in the context of certain radio access technologies, networks and networking topologies such as IEEE 802.11, the proposed concepts, schemes and any variation(s)/derivative(s) thereof may be implemented in, for and by other types of radio access technologies, networks and network topologies such as, for example and without limitation, Bluetooth, ZigBee, infrared, near-field communication (NFC), $5^{th}$ Generation (5G), New Radio (NR), Evolved Packet System (EPS), Universal Terrestrial Radio Access Network (UTRAN), Evolved UTRAN (E-UTRAN), Global System for Mobile communications (GSM), General Packet Radio Service (GPRS)/Enhanced Data rates for Global Evolution (EDGE) Radio Access Network (GERAN), Long-Term Evolution (LTE), LTE-Advanced, LTE-Advanced Pro, Internet-of-Things (IoT) and Narrow Band Internet of Things (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Under a proposed scheme regarding a dynamic flow control mechanism in accordance with the present disclosure, a receiving entity (e.g., a station, or STA, in a wireless local area network (WLAN)) may control, dynamically change and/or pause an AMPDU aggregation count by appropriately notifying a transmitting entity (e.g., an access point, or AP, in a WLAN). Under the proposed scheme, the receiving entity may use one or more reserved bits of a Block-ACK frame to notify the transmitting entity regarding an update for AMPDU aggregation.

Figure 1:
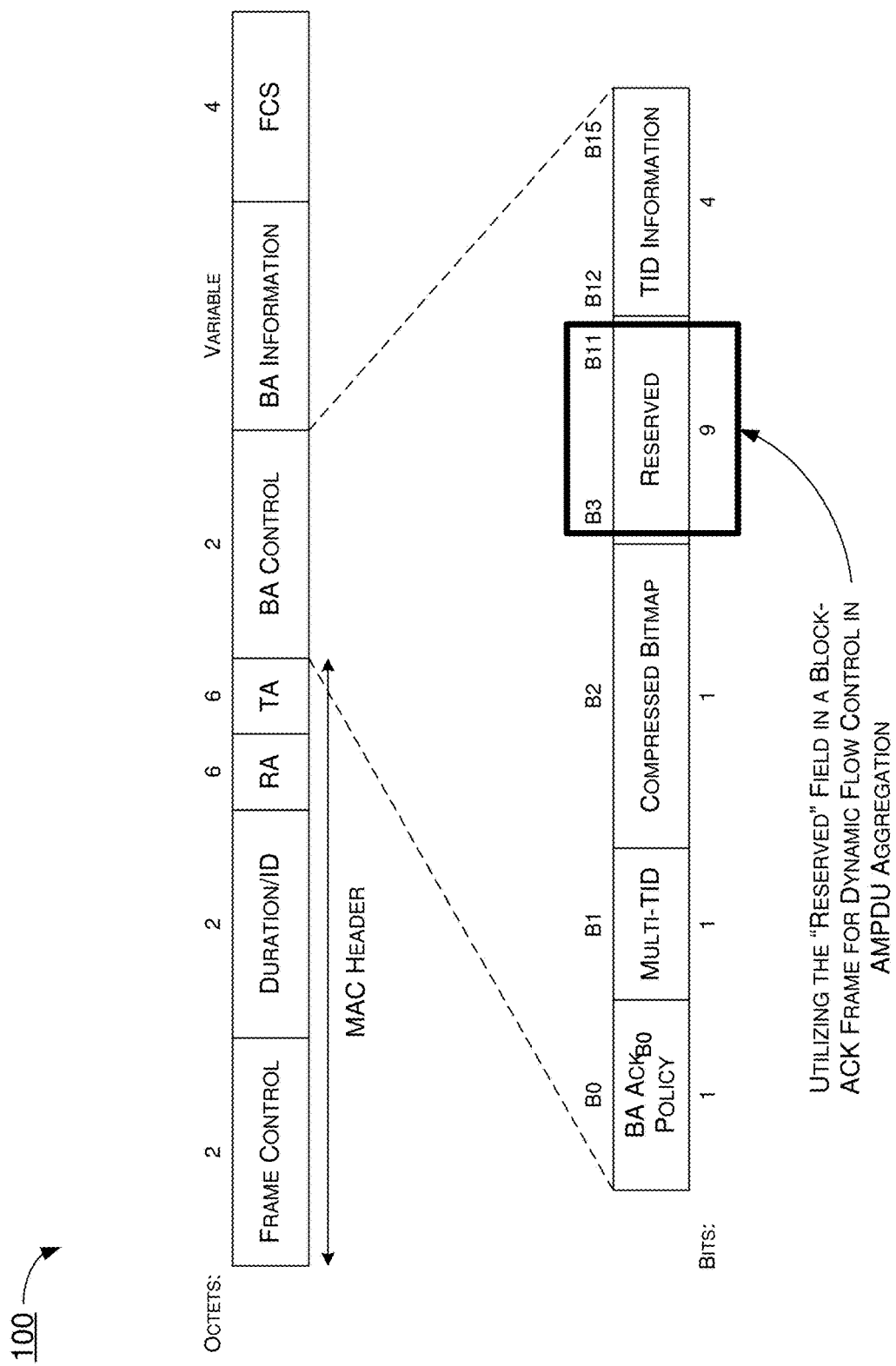
FIG. 1 is a diagram of an example Block-ACK frame in accordance with an implementation of the present disclosure.

FIG. 1 illustrates an example Block-ACK frame 100 in accordance with an implementation of the present disclosure. Referring to FIG. 1, in Block-ACK frame 100, the "Reserved" field may be utilized to address aforementioned issue. That is, the receiving entity may use the "Reserved" field in a Block-ACK (BA) frame to notify the transmitting entity of AMPDU(s) to control AMPDU aggregation accordingly. For instance, the receiving entity may notify the transmitting entity a new AMPDU count (e.g., BA window size) by using the "Reserved" field in the Block-ACK frame. In some cases, the receiving entity may notify the transmitting entity the aggregation count within limits of an initial BA window size (e.g., a new aggregation count being less than or equal to the initial BA window size). Additionally, the receiving entity may pause AMPDU aggregation from the transmitting entity by sending some wildcard value (e.g., zero or a value greater than the initial Block-ACK window size) using one or more bits in the "Reserved" field. In such cases, the transmitting entity may poll the receiving entity to resume AMPDU aggregation by sending a Block-ACK request (BAR) frame to the receiving entity and then checking the value in the "Reserved" field in a subsequent Block-ACK frame received from the receiving entity. Accordingly, as the receiving entity may notify the transmitting entity an updated aggregation count in any given Block-ACK frame, the transmitting entity may dynamically update its transmit window size in real time (e.g., when preparing a subsequent AMPDU candidate).

Figure 2:
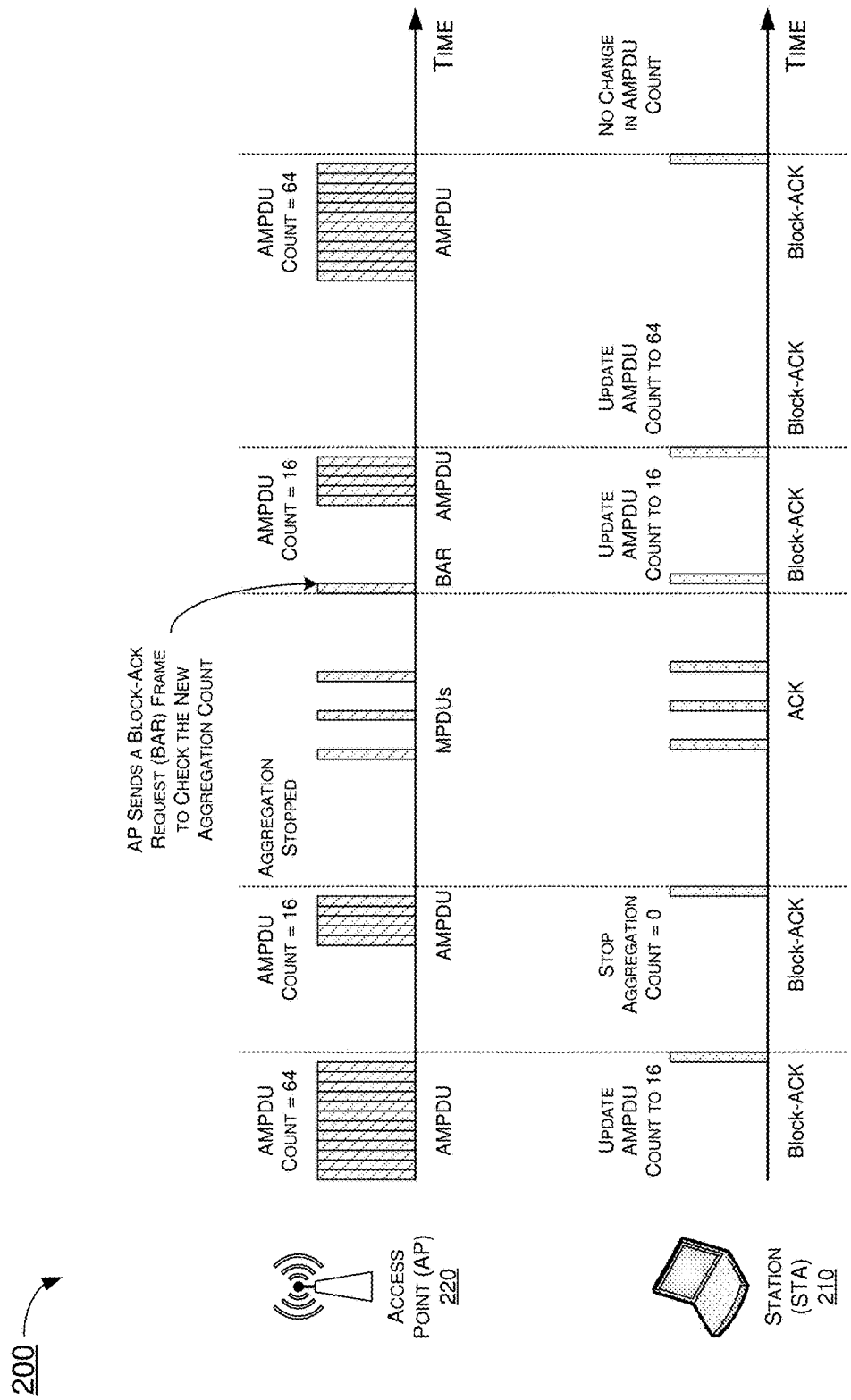
FIG. 2 is a diagram of an example scenario in accordance with an implementation of the present disclosure.

FIG. 2 illustrates an example scenario 200 of dynamic flow control in AMPDU aggregation in wireless communications in accordance with an implementation of the present disclosure. Scenario 200 may involve a station 210 (STA 210), as a first communication apparatus, and an access point 220 (AP 220), as a second communication apparatus. STA 210 and AP 220 may wirelessly communicate with each other in accordance with one or more wireless communication protocols, standards and/or specifications such as the IEEE 802.11 specification.

Referring to FIG. 2, initially, AP 220 and STA 210 may negotiate an initial Block-ACK window size, which may be the upper limit on AMPDU count. In the example shown in FIG. 2, the initial Block-ACK window size is 64 (e.g., AMPDU count=64). Thus, initially, AP 220 may transmit aggregated MPDUs to STA 210 with the AMPDU count being 64. Then, STA 210 may determine to adjust the AMPDU aggregation and, accordingly, STA 210 may transmit a first Block-ACK frame to AP 220 with a value in the reserved field in the first Block-ACK frame indicating 16 to decrease the AMPDU count from 64 to 16. As a result, in the subsequent transmission of MPDUs, AP 220 may transmit aggregated MPDUs to STA 210 with the AMPDU count being 16.

In scenario 200, STA 210 may determine to pause or otherwise stop AMPDU aggregation. Thus, STA 210 may transmit a second Block-ACK frame to AP 220 with a value in the reserved field in the second Block-ACK frame being a wildcard value (e.g., 0 or a value greater than the initial Block-ACK window size). As a result, in subsequent transmissions of MPDUs, AP 220 may transmit discrete MPDUs individually or otherwise separately, and STA 210 may acknowledge receipt of each of the MPDUs by transmitting to AP 220 a respective acknowledgement (ACK) frame correspondingly.

At one point, AP 220 may transmit a Block-ACK request (BAR) frame to STA 210 to check the new aggregation count. In response, STA 210 may resume AMPDU aggregation by transmitting a third Block-ACK frame to AP 220 with a value in the reserved field in the third Block-ACK frame being updated to 16 to change the AMPDU count from 0 to 16. As a result, in the subsequent transmission of MPDUs, AP 220 may transmit aggregated MPDUs to STA 210 with the AMPDU count being 16. Then, STA 210 may determine to further adjust the AMPDU aggregation by transmitting a fourth Block-ACK frame to AP 220 with a value in the reserved field in the fourth Block-ACK frame being updated to 64 to increase the AMPDU count from 16 to 64. As a result, in the subsequent transmission of MPDUs, AP 220 may transmit aggregated MPDUs to STA 210 with the AMPDU count being 64. In acknowledging receipt of the AMPDUs, STA 210 may transmit a fifth Block-ACK frame to AP 220 without indicating any update or change to the AMPDU count.

In view of the above, those skilled in the art would appreciate that the proposed scheme provides a mechanism for dynamic flow control for a receiving entity (e.g., STA 210) unlike Transmission Control Protocol (TCP) while AMPDU transmission is ongoing. Advantageously, the proposed scheme may be quite useful in certain implementation scenarios, allowing dynamic management of transmitter packet flow based on the available Wi-Fi time slice. In other implementation scenarios, the proposed scheme may also allow dynamic management of transmitter packet flow based on the available Wi-Fi individual mode time slice. Moreover, the proposed scheme may allow receiver data flow to be controlled, thereby allowing the receiving entity to prioritize its transmission of data. Furthermore, the proposed scheme may enable a fastest way to change the aggregation count and, thus, reduce packet drop (e.g., in case of interface switching/channel switching) by changing the count and/or stopping the AMPDU aggregation. Thus, overall system performance in terms of throughput may be improved.

Illustrative Implementations

Figure 3:
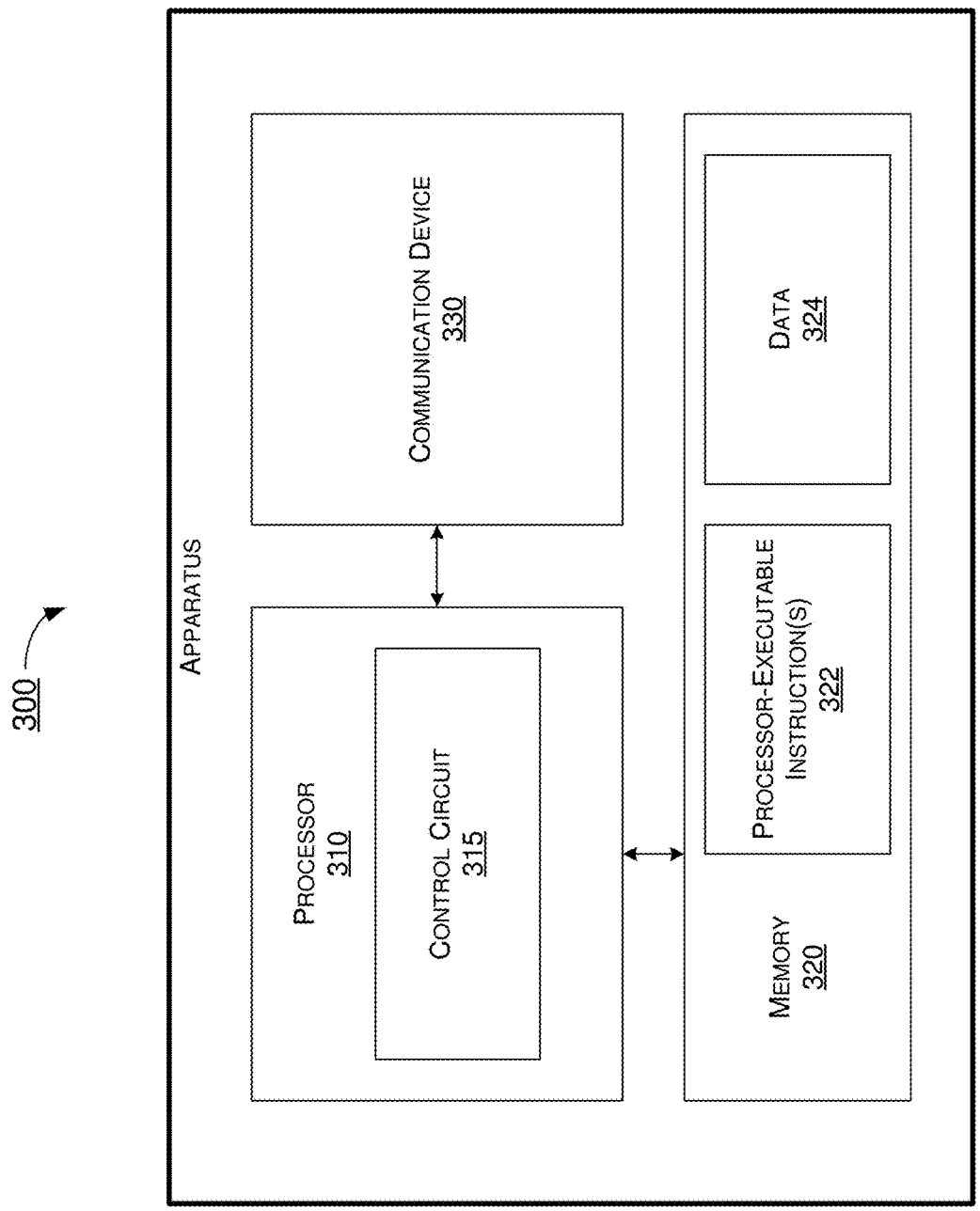
FIG. 3 is a simplified block diagram of an example apparatus in accordance with an implementation of the present disclosure.

FIG. 3 illustrates an example apparatus 300 in accordance with an implementation of the present disclosure. Apparatus 300 may perform various functions to implement schemes, techniques, processes and methods described herein pertaining to dynamic flow control in AMPDU aggregation in wireless communications. Apparatus 300 may be a part of an electronic apparatus which may be a communication device, a computing apparatus, a portable or mobile apparatus, or a wearable apparatus. For instance, apparatus 300 may be implemented in or as an access point (AP), a SoftAP, a smartphone, a smartwatch, a smart bracelet, a smart necklace, a personal digital assistant, or a computing device such as a tablet computer, a laptop computer, a notebook computer, a desktop computer, or a server. Alternatively, apparatus 300 may be implemented in the form of one or more integrated-circuit (IC) chips such as, for example and not limited to, one or more single-core processors, one or more multi-core processors, or one or more complex-instruction-set-computing (CISC) processors. Apparatus 300 may include at least those components shown in FIG. 3, such as a processor 310. Additionally, apparatus 300 may include a communication device 330 which may be a transceiver. Communication device 330 may be configured to transmit and receive data wirelessly (e.g., in compliance with the IEEE 802.11 specification and/or any applicable wireless protocols and standards).

In some implementations, apparatus 300 may include a memory 320. Memory 320 may be a storage device configured to store one or more sets of codes, programs and/or instructions 322 as well as data 324 therein. For example, memory 320 may be operatively coupled to processor 310 to receive data 324. When apparatus 300 is implemented in or as a first communication device such as STA 210, memory 320 may store an initial Block-ACK window size, as data 324, negotiated with another apparatus such as AP 220. Memory 320 may be implemented by any suitable technology and may include volatile memory and/or non-volatile memory. For example, memory 320 may include a type of random-access memory (RAM) such as dynamic RAM (DRAM), static RAM (SRAM), thyristor RAM (T-RAM) and/or zero-capacitor RAM (Z-RAM). Alternatively, or additionally, memory 320 may include a type of read-only memory (ROM) such as mask ROM, programmable ROM (PROM), erasable programmable ROM (EPROM) and/or electrically erasable programmable ROM (EEPROM). Alternatively, or additionally, memory 320 may include a type of non-volatile random-access memory (NVRAM) such as flash memory, solid-state memory, ferroelectric RAM (FeRAM), magnetoresistive RAM (MRAM) and/or phase-change memory.

Processor 310 may be implemented in the form of one or more single-core processors, one or more multi-core processors, or one or more CISC processors. That is, processor 310 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure, including dynamic flow control in AMPDU aggregation in wireless communications.

Processor 310 may access memory 320 to execute the one or more instructions stored in memory 320. Upon executing the one or more sets of instructions, processor 310 may be configured to perform operations pertaining to dynamic flow control in AMPDU aggregation in wireless communications in accordance with the present disclosure. In some implementations, processor 310 may include a control circuit 315 capable of performing operations pertaining to dynamic flow control in AMPDU aggregation in wireless communications in accordance with the present disclosure. For instance, when apparatus 300 is implemented as STA 210 in scenario 200, control circuit 315 may dynamically adjust AMPDU aggregation received from a second communication apparatus (e.g., AP 210) by transmitting, via communication device 330, one or more Block-ACK frames to the second communication apparatus.

In one aspect with respect to dynamic flow control in AMPDU aggregation in wireless communications, control circuit 315 may negotiate, via communication device 330, with a second communication apparatus (e.g., AP 220) an initial Block-ACK window size for AMPDU aggregation. Additionally, control circuit 315 may adjust the AMPDU aggregation during subsequent communication with the second communication apparatus. For instance, control circuit 315 may create a Block-ACK frame with a reserved field having a value indicating a change to the AMPDU aggregation. Additionally, control circuit 315 may transmit, via communication device 330, the Block-ACK frame to the second communication apparatus.

In some implementations, in adjusting the AMPDU aggregation, control circuit 315 may pause the AMPDU aggregation. In some implementations, the value of the reserved field in the Block-Ack frame may be a wildcard value (e.g., zero or a value greater than the initial Block-ACK window size).

In some implementations, in adjusting the AMPDU aggregation, control circuit 315 may perform further operations. For instance, control circuit 315 may receive, via communication device 330, a Block-Ack request (BAR) frame from the second communication apparatus. Moreover, control circuit 315 may resume the AMPDU aggregation. In some implementations, in resuming the AMPDU aggregation, control circuit 315 may perform certain operations. For instance, control circuit 315 may create a second Block-ACK frame with a reserved field having a non-zero value equal to or less than the initial Block-ACK window size. Additionally, control circuit 315 may transmit, via communication device 330, the second Block-ACK frame to the second communication apparatus.

In some implementations, in adjusting the AMPDU aggregation, control circuit 315 may perform further operations. For instance, control circuit 315 may receive, via communication device 330, one or more MPDUs from the second communication apparatus responsive to pausing the AMPUD aggregation. Furthermore, control circuit 315 may transmit, via communication device 330, an ACK frame to the second communication apparatus upon receiving each of the one or more MPDUs.

In some implementations, in adjusting the AMPDU aggregation, control circuit 315 may decrease a count of MPDUs for the AMPDU aggregation from the initial Block-ACK window size. In some implementations, in adjusting the AMPDU aggregation, control circuit 315 may also increase the count of MPDUs for the AMPDU aggregation to another value equal to or less than the initial Block-ACK window size.

In another aspect with respect to dynamic flow control in AMPDU aggregation in wireless communications, control circuit 315 may receive, via communication device 330, AMPDUs from a second communication apparatus (e.g., AP 220). Moreover, control circuit 315 may transmit, via communication device 330, a Block-ACK frame to the second communication apparatus, with the Block-ACK frame simultaneously acknowledging receipt of the AMPDUs and adjusting an AMPDU aggregation window size for subsequent communication with the second communication apparatus.

In some implementations, the Block-ACK frame may indicate to the second communication apparatus to pause the AMPDU aggregation. In some implementations, a value of a reserved field in the Block-Ack frame may be a wildcard value (e.g., zero or a value greater than an initial Block-ACK window size). In some implementations, control circuit 315 may perform additional operations. For instance, control circuit 315 may receive, via communication device 330, a Block-Ack request (BAR) frame from the second communication apparatus. Moreover, control circuit 315 may resume the AMPDU aggregation. In some implementations, in resuming the AMPDU aggregation, control circuit 315 may perform certain operations. For instance, control circuit 315 may create a second Block-ACK frame with a reserved field having a non-zero value equal to or less than the initial Block-ACK window size. Additionally, control circuit 315 may transmit, via communication device 330, the second Block-ACK frame to the second communication apparatus.

In some implementations, control circuit 315 may perform additional operations. For instance, control circuit 315 may receive, via communication device 330, one or more MPDUs from the second communication apparatus responsive to pausing the AMPUD aggregation. Moreover, control circuit 315 may transmit, via communication device 330, an ACK frame to the second communication apparatus upon receiving each of the one or more MPDUs.

In some implementations, the Block-ACK frame may indicate to the second communication apparatus to adjust the AMPDU aggregation window size by indicating a decrease in a count of MPDUs for the AMPDU aggregation from an initial Block-ACK window size negotiated with the second communication apparatus. In some implementations, control circuit 315 may perform additional operations. For instance, control circuit 315 may transmit, via communication device 330, a second Block-ACK frame to the second communication apparatus to further adjust the AMPDU aggregation window size. In such cases, a value of a reserved field in the second Block-ACK frame may indicate an increase in the count of MPDUs for the AMPDU aggregation to be equal to or less than the initial Block-ACK window size.

Illustrative Processes

Figure 4:
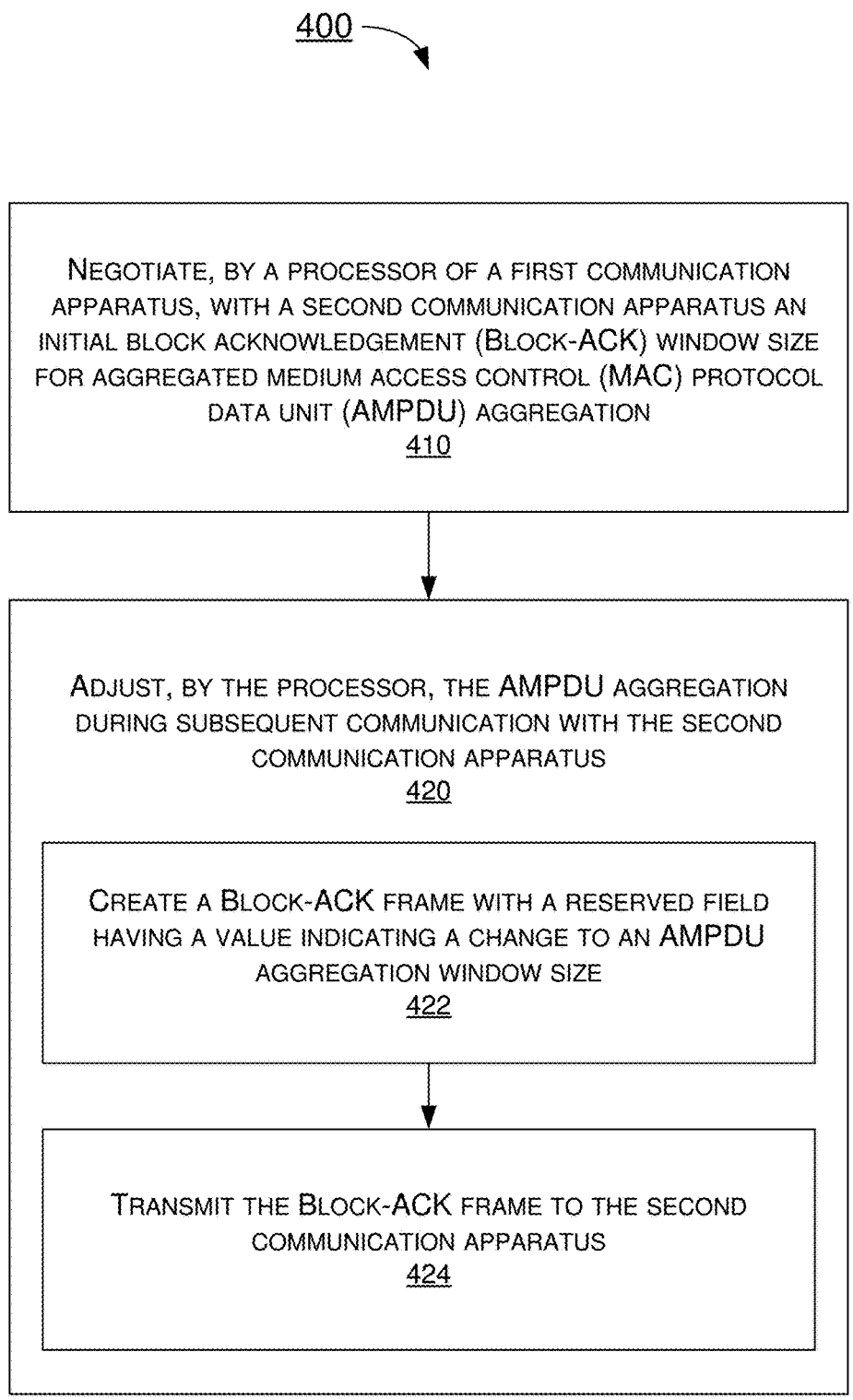
FIG. 4 is a flowchart of an example process in accordance with an implementation of the present disclosure.

FIG. 4 illustrates an example process 400 in accordance with an implementation of the present disclosure. Process 400 may represent an aspect of implementing various proposed designs, concepts, schemes, systems and methods described above, whether partially or entirely, including those pertaining to FIG. 1~FIG. 3. More specifically, process 400 may represent an aspect of the proposed concepts and schemes pertaining to dynamic flow control in AMPDU aggregation in wireless communications. Process 400 may include one or more operations, actions, or functions as illustrated by one or more of blocks 410 and 420 as well as sub-blocks 422 and 424. Although illustrated as discrete blocks, various blocks of process 400 may be divided into additional blocks, combined into fewer blocks, or eliminated, depending on the desired implementation. Moreover, the blocks/sub-blocks of process 400 may be executed in the order shown in FIG. 4 or, alternatively in a different order. Furthermore, one or more of the blocks/sub-blocks of process 400 may be executed iteratively. Process 400 may be implemented by or in apparatus 300 as well as any variations thereof. Solely for illustrative purposes and without limiting the scope, process 400 is described below in the context of apparatus 300 as STA 210 in scenario 200. Process 400 may begin at block 410.

At 410, process 400 may involve processor 310 of apparatus 300 (e.g., STA 210) negotiating, via communication device 330, with a second communication apparatus (e.g., AP 220) an initial Block-ACK window size for AMPDU aggregation. Process 400 may proceed from 410 to 420.

At 420, process 400 may involve processor 310 adjusting the AMPDU aggregation during subsequent communication with the second communication apparatus. The adjusting may involve processor 310 performing certain operations as represented by 422 and 424.

At 422, process 400 may involve processor 310 creating a Block-ACK frame with a reserved field having a value indicating a change to an AMPDU aggregation window size. Process 400 may proceed from 422 to 424.

At 424, process 400 may involve processor 310 transmitting, via communication device 330, the Block-ACK frame to the second communication apparatus.

In some implementations, in adjusting the AMPDU aggregation, process 400 may involve processor 310 pausing the AMPDU aggregation. In some implementations, the value of the reserved field in the Block-Ack frame may be a wildcard value (e.g., zero or a value greater than the initial Block-ACK window size).

In some implementations, in adjusting the AMPDU aggregation, process 400 may involve processor 310 performing further operations. For instance, process 400 may involve processor 310 receiving, via communication device 330, a Block-Ack request (BAR) frame from the second communication apparatus. Moreover, process 400 may involve processor 310 resuming the AMPDU aggregation. In some implementations, in resuming the AMPDU aggregation, process 400 may involve processor 310 performing certain operations. For instance, process 400 may involve processor 310 creating a second Block-ACK frame with a reserved field having a non-zero value equal to or less than the initial Block-ACK window size. Additionally, process 400 may involve processor 310 transmitting, via communication device 330, the second Block-ACK frame to the second communication apparatus.

In some implementations, in adjusting the AMPDU aggregation, process 400 may involve processor 310 performing further operations. For instance, process 400 may involve processor 310 receiving, via communication device 330, one or more MPDUs from the second communication apparatus responsive to pausing the AMPDU aggregation. Furthermore, process 400 may involve processor 310 transmitting, via communication device 330, an ACK frame to the second communication apparatus upon receiving each of the one or more MPDUs.

In some implementations, in adjusting the AMPDU aggregation, process 400 may involve processor 310 decreasing a count of MPDUs for the AMPDU aggregation from the initial Block-ACK window size. In some implementations, in adjusting the AMPDU aggregation, process 400 may further involve processor 310 increasing the count of MPDUs for the AMPDU aggregation to another value equal to or less than the initial Block-ACK window size.

Figure 5:
FIG. 5 is a flowchart of an example process in accordance with an implementation of the present disclosure.

FIG. 5 illustrates an example process 500 in accordance with an implementation of the present disclosure. Process 500 may represent an aspect of implementing various proposed designs, concepts, schemes, systems and methods described above, whether partially or entirely, including those pertaining to FIG. 1~FIG. 3. More specifically, process 500 may represent an aspect of the proposed concepts and schemes pertaining to dynamic flow control in AMPDU aggregation in wireless communications. Process 500 may include one or more operations, actions, or functions as illustrated by one or more of blocks 510 and 520. Although illustrated as discrete blocks, various blocks of process 500 may be divided into additional blocks, combined into fewer blocks, or eliminated, depending on the desired implementation. Moreover, the blocks/sub-blocks of process 500 may be executed in the order shown in FIG. 5 or, alternatively in a different order. Furthermore, one or more of the blocks/sub-blocks of process 500 may be executed iteratively. Process 500 may be implemented by or in apparatus 300 as well as any variations thereof. Solely for illustrative purposes and without limiting the scope, process 500 is described below in the context of apparatus 300 as STA 210 in scenario 200. Process 500 may begin at block 510.

At 510, process 500 may involve processor 310 of apparatus 300 receiving, via communication device 330, AMPDUs from a second communication apparatus (e.g., AP 220). Process 500 may proceed from 510 to 520.

At 520, process 500 may involve processor 310 transmitting, via communication device 330, a Block-ACK frame to the second communication apparatus, with the Block-ACK frame simultaneously acknowledging receipt of the AMPDUs and adjusting an AMPDU aggregation window size for subsequent communication with the second communication apparatus.

In some implementations, the Block-ACK frame may indicate to the second communication apparatus to pause the AMPDU aggregation. In some implementations, a value of a reserved field in the Block-Ack frame may be a wildcard value (e.g., zero or a value greater than an initial Block-ACK window size). In some implementations, process 500 may involve processor 310 performing additional operations. For instance, process 500 may involve processor 310 receiving, via communication device 330, a Block-Ack request (BAR) frame from the second communication apparatus. Moreover, process 500 may involve processor 310 resuming the AMPDU aggregation. In some implementations, in resuming the AMPDU aggregation, process 500 may further involve processor 310 performing certain operations. For instance, process 500 may involve processor 310 creating a second Block-ACK frame with a reserved field having a non-zero value equal to or less than the initial Block-ACK window size. Additionally, process 500 may involve processor 310 transmitting, via communication device 330, the second Block-ACK frame to the second communication apparatus.

In some implementations, process 500 may involve processor 310 performing additional operations. For instance, process 500 may involve processor 310 receiving, via communication device 330, one or more MPDUs from the second communication apparatus responsive to pausing the AMPDU aggregation. Moreover, process 500 may involve processor 310 transmitting, via communication device 330, an ACK frame to the second communication apparatus upon receiving each of the one or more MPDUs.

In some implementations, the Block-ACK frame may indicate to the second communication apparatus to adjust the AMPDU aggregation window size by indicating a decrease in a count of MPDUs for the AMPDU aggregation from an initial Block-ACK window size negotiated with the second communication apparatus. In some implementations, process 500 may involve processor 310 performing additional operations. For instance, process 500 may involve processor 310 transmitting, via communication device 330, a second Block-ACK frame to the second communication apparatus to further adjust the AMPDU aggregation window size. In such cases, a value of a reserved field in the second Block-ACK frame may indicate an increase in the count of MPDUs for the AMPDU aggregation to be equal to or less than the initial Block-ACK window size.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    negotiating, by a processor of a first communication apparatus, with a second communication apparatus an initial block acknowledgement (Block-ACK) window size for aggregated medium access control (MAC) protocol data unit (AMPDU) aggregation; and
    adjusting, by the processor, the AMPDU aggregation during subsequent communication with the second communication apparatus by:
        creating a Block-ACK frame with a reserved field having a value indicating a change to an AMPDU aggregation window size; and
        transmitting the Block-ACK frame to the second communication apparatus,
    wherein the adjusting of the AMPDU aggregation further comprises either or both of:
        pausing the AMPDU aggregation with a value of the reserved field in the Block-ACK frame being a wildcard value greater than the initial Block-ACK window size; and
        decreasing a count of MAC protocol data units (MPDUs) for the AMPDU aggregation from the initial Block-ACK window size to a non-zero value.

2. The method of claim 1, wherein the adjusting of the AMPDU aggregation further comprises:
    receiving a Block-ACK request (BAR) frame from the second communication apparatus; and
    resuming the AMPDU aggregation.

3. The method of claim 2, wherein the resuming of the AMPDU aggregation comprises:
    creating a second Block-ACK frame with a reserved field having a non-zero value equal to or less than the initial Block-ACK window size; and
    transmitting the second Block-ACK frame to the second communication apparatus.

4. The method of claim 1, wherein the adjusting of the AMPDU aggregation further comprises:
    receiving one or more MAC protocol data units (MPDUs) from the second communication apparatus responsive to pausing the AMPDU aggregation; and
    transmitting an acknowledge (ACK) frame to the second communication apparatus upon receiving each of the one or more MPDUs.

5. The method of claim 1, wherein the adjusting of the AMPDU aggregation further comprises increasing the count of MPDUs for the AMPDU aggregation to another value equal to or less than the initial Block-ACK window size.

6. A method, comprising:
    receiving, by a processor of a first communication apparatus, aggregated medium access control (MAC) protocol data units (AMPDUs) from a second communication apparatus; and
    transmitting, by the processor, a block acknowledgement (Block-ACK) frame to the second communication apparatus,
    wherein the Block-ACK frame simultaneously acknowledges receipt of the AMPDUs and adjusts an AMPDU aggregation window size for subsequent communication with the second communication apparatus,
    wherein the adjusting of the AMPDU aggregation window size comprises either or both of:
        pausing AMPDU aggregation with a value of a reserved field in the Block-ACK frame being a wildcard value greater than an initial Block-ACK window size; and
        decreasing a count of MAC protocol data units (MPDUs) for the AMPDU aggregation from the initial Block-ACK window size to a non-zero value.

7. The method of claim 6, further comprising:
    receiving, by the processor, a Block-ACK request (BAR) frame from the second communication apparatus; and
    resuming, by the processor, the AMPDU aggregation.

8. The method of claim 7, wherein the resuming of the AMPDU aggregation comprises:
    creating a second Block-ACK frame with a reserved field having a non-zero value equal to or less than the initial Block-ACK window size; and
    transmitting the second Block-ACK frame to the second communication apparatus.

9. The method of claim 6, further comprising:
    receiving, by the processor, one or more MAC protocol data units (MPDUs) from the second communication apparatus responsive to pausing the AMPDU aggregation; and
    transmitting, by the processor, an acknowledge (ACK) frame to the second communication apparatus upon receiving each of the one or more MPDUs.

10. The method of claim 6, further comprising:
    transmitting, by the processor, a second Block-ACK frame to the second communication apparatus to further adjust the AMPDU aggregation window size,
    wherein a value of a reserved field in the second Block-ACK frame indicates an increase in the count of MPDUs for AMPDU aggregation to be equal to or less than the initial Block-ACK window size.

11. An apparatus, comprising:
    a communication device which, during operation, wirelessly communicates with a second communication apparatus; and
    a processor coupled to the communication device such that, during operation, the processor dynamically adjusts aggregated medium access control (MAC) protocol data unit (AMPDU) aggregation received from the second communication apparatus by transmitting, via the communication device, one or more block acknowledgement (Block-ACK) frames to the second communication apparatus,
    wherein the processor adjusts the AMPDU aggregation by performing either or both of:

pausing the AMPDU aggregation with a value of a reserved field in the one or more Block-ACK frames being a wildcard value greater than an initial Block-ACK window size; and decreasing a count of MAC protocol data units (MPDUs) for the AMPDU aggregation from the initial Block-ACK window size to a non-zero value.

12. The apparatus of claim 11, wherein the processor further adjusts the AMPDU aggregation by resuming the AMPDU aggregation responsive to receiving a Block-ACK request (BAR) frame from the second communication apparatus.

13. The apparatus of claim 11, wherein the processor adjusts the AMPDU aggregation by changing a count of MAC protocol data units (MPDUs) for the AMPDU aggregation between zero and an initial Block-ACK window size negotiated with the second communication apparatus.

* * * * *